(12) United States Patent
Shaffer et al.

(10) Patent No.: US 7,885,674 B2
(45) Date of Patent: Feb. 8, 2011

(54) DETERMINING WHICH CHANNELS ARE ACCESSIBLE BY A COMMUNICATION DEVICE IN A PUSH-TO-TALK COMMUNICATION NETWORK

(75) Inventors: Shmuel Shaffer, Palo Alto, CA (US); Steven L. Christenson, Campbell, CA (US); Neil Anthony Savigear Evans, San Jose, CA (US)

(73) Assignee: Cisco Technology, Inc., San Jose, CA (US)

( * ) Notice: Subject to any disclaimer, the term of this patent is extended or adjusted under 35 U.S.C. 154(b) by 978 days.

(21) Appl. No.: 11/466,388

(22) Filed: Aug. 22, 2006

(65) Prior Publication Data
US 2008/0051124 A1    Feb. 28, 2008

(51) Int. Cl.
  *H04B 7/00*  (2006.01)
(52) U.S. Cl. .................... 455/518; 455/519; 455/520; 370/340; 370/341
(58) Field of Classification Search ......... 455/517–521; 370/340–341
See application file for complete search history.

(56) References Cited

U.S. PATENT DOCUMENTS

| 4,799,156 | A  | * | 1/1989  | Shavit et al. ............. 705/26 |
| 5,265,262 | A  | * | 11/1993 | Grube et al. ............. 455/17 |
| 6,978,148 | B2 | * | 12/2005 | Adachi et al. ............ 455/517 |
| 7,394,798 | B2 | * | 7/2008  | Naghian ................ 370/338 |
| 2002/0090912 | A1 | * | 7/2002 | Cannon et al. ............ 455/41 |
| 2003/0013473 | A1 | * | 1/2003 | Adachi et al. ............ 455/517 |
| 2004/0128688 | A1 | * | 7/2004 | Seo .................... 725/62 |
| 2004/0192221 | A1 | * | 9/2004 | Matsunaga .............. 455/76 |
| 2007/0242650 | A1 | * | 10/2007 | Fujiwara .............. 370/341 |

* cited by examiner

*Primary Examiner*—Edward Urban
*Assistant Examiner*—Fayyaz Alam
(74) *Attorney, Agent, or Firm*—Schwegman, Lundberg & Woessner, P.A.

(57) ABSTRACT

A method of and system to determine which channels are accessible by a communication device in a push-to-talk communication network are disclosed. The method may comprise sending an identifying network connectivity message to the communication device across a particular network channel, the identifying network connectivity message including an identification code. The method further comprises querying the communication device for the identification code to determine if the communication device successfully received the identifying network connectivity message, thereby to establish if the particular network channel is accessible by the communication device.

25 Claims, 7 Drawing Sheets

DETERMINING WHICH CHANNELS ARE ACCESSIBLE BY A COMMUNICATION DEVICE IN A PUSH-TO-TALK COMMUNICATION NETWORK

FIELD

This application relates generally to network communication, and in an example embodiment to a method and system to determine which channels are accessible by a communication device in a push-to-talk communication network.

BACKGROUND

IPICS (IP Interoperability and Collaboration System), available from Cisco Systems, Inc., provides a means for rendering channels and virtual talk groups (VTGs) to endpoint devices (e.g. mobile communication devices), enabling users to participate in push-to-talk (P2T) communication. For simplicity of explanation, the term "channel" as used herein comprises both channels and virtual talk groups.

Push-to-talk communication is analogous in some respects to broadcast radio, e.g. FM radio stations. Whether or not an endpoint device can subscribe to (e.g. communicate with) a particular channel depends on the network topology, attachment of the endpoint to the network, network configuration, the configuration of endpoint device, and the configuration of the channel itself. Such channels are typically used by emergency services to broadcast information, and in contrast with the radio station (which usually transmits a signal continuously) the channel is often silent, e.g., in times when no communication is necessary. Thus, an end user often does not know whether silence indicates that he/she is listening to the channel but there is no current communication, whether he/she is not listing to the channel at all, or whether he/she is listening to a completely different channel.

BRIEF DESCRIPTION OF DRAWINGS

The present invention is illustrated by way of example and not limitation in the figures of the accompanying drawings, in which like references indicate similar elements and in which.

DETAILED DESCRIPTION OF THE DRAWINGS

In the following description, for purposes of explanation, numerous specific details are set forth in order to provide a thorough understanding of example embodiments of the present invention. It will be evident, however, to one skilled in the art that the present invention may be practiced without these specific details.

Figure 1:
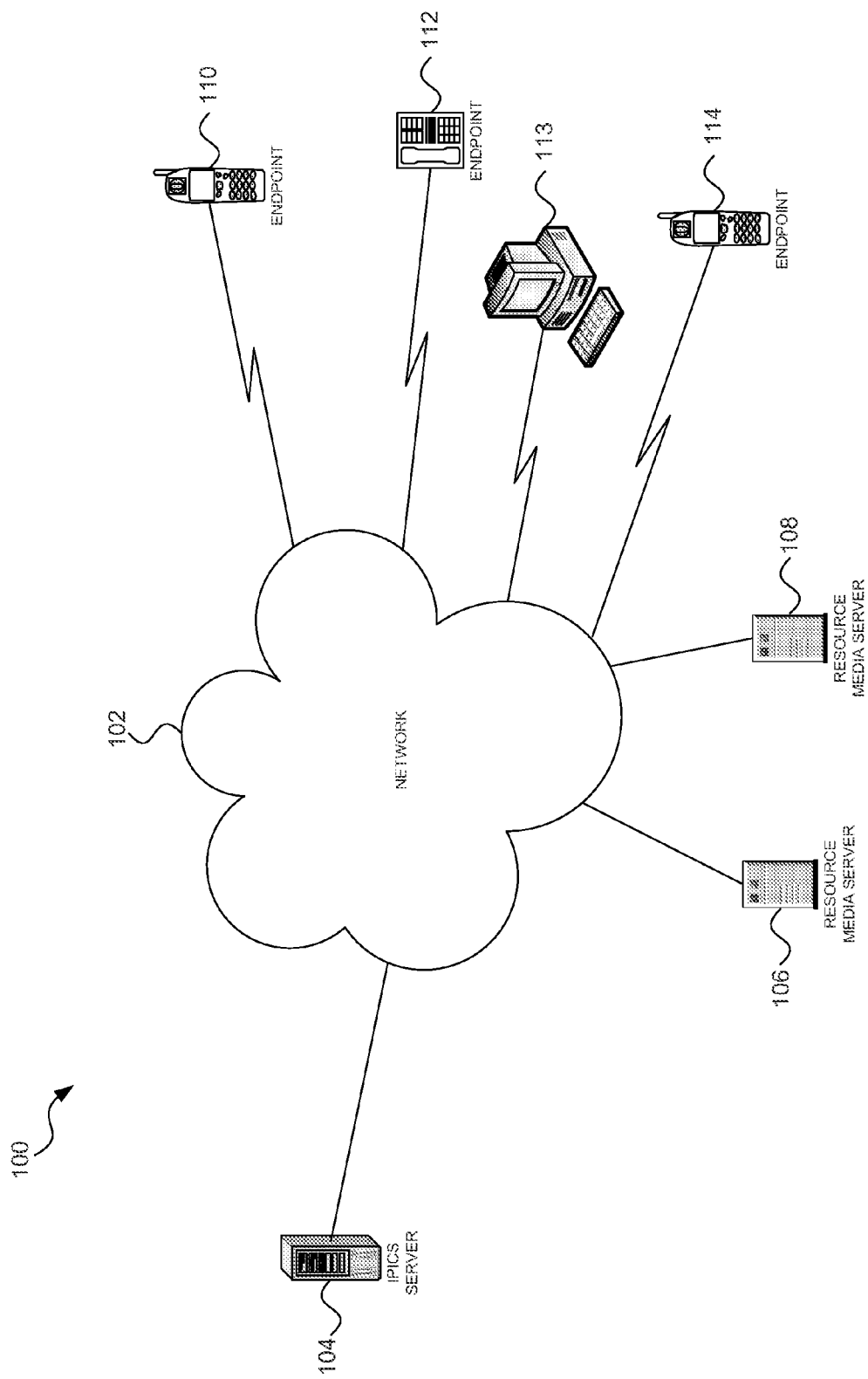
FIG. 1 shows a schematic representation of a system, in accordance with an example embodiment, to determine which channels are accessible by a communication device in a push-to-talk communication network.

FIG. 1 shows a system 100, in accordance with an example embodiment, to determine which channels (or Virtual Talk Groups (VTGs)) are accessible by a communication device or endpoint in a push-to-talk communication network. The system includes a push-to-talk compatible network 102, which may include, at least partially, the Internet. Connected to the network 102 is a push-to-talk integration server, for example an IPICS server 104. The push-to-talk integration server may integrate disparate push-to-talk, voice, video, and data networks (or any combination thereof). It is to be understood that although this example embodiment may find application for use with an IPICS server 104, and will be further described by way of example with reference thereto, the example embodiments described herein apply in any push-to-talk network environment in which accessibility and/or addressability may be of importance. It should be noted that, although some example embodiments described herein utilize multicast protocol, the embodiments are not restricted to deployment in a multicast environment and apply equally in a unicast environment or any other network communication environment.

Resource media servers (RMS) 106 and 108 (only two of which are shown by way of example) are further shown to be connected to the network 102, which may be responsible for hosting media content, facilitate communication over channels, virtual talk groups, or the like. A plurality of endpoints 110 to 114 are also connected to the network 102. The resource media servers 106 and 108 may be accessible by one or more of the endpoints 110 to 114. In addition, the endpoints 110 to 114 may access one another, thereby to allow users to communicate directly. The endpoints 110 to 114 may be in the form of IP (Internet protocol) telephones, e.g., VoIP (Voice over IP) telephones whether mobile or fixed, or any other communication device capable of push-to-talk telephony. In an example embodiment, a Personal Computer/Laptop computer may be provided with, for example, a Cisco soft radio PMC (Push-to-Talk Management Center) client (see PC 113 in FIG. 1).

The system 100 is configured to determine on which channels (e.g., but not restricted to multicast channels) the endpoints 110 to 114 can actually transmit or receive data from the resource media servers 106 to 108, or which endpoints 110 to 114 can actually communicate with one another. Further, the system 100 is also configured to process this information.

Figure 2A:
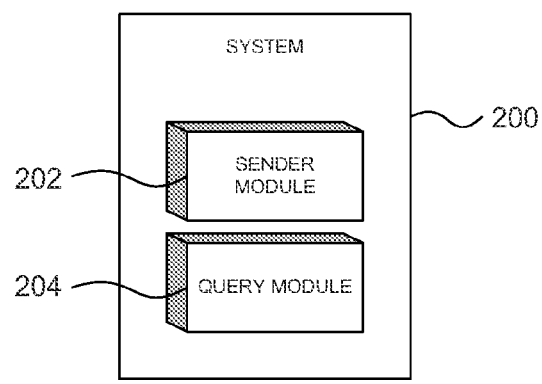
FIG. 2a shows a high-level schematic representation of a computer system, in accordance with an example embodiment, that may form part of the system of FIG. 1.

Referring to FIG. 2a, a high level representation of a system 200, in accordance with an example embodiment, is shown that may form part of the system of FIG. 1. The system 200 is not necessarily consolidated or integrated into one device, and may be distributed across a number of devices.

The system 200 comprises a plurality of conceptual modules, which corresponded to functionality performed by the computer system. In an example embodiment, the system 200 comprises a sender module 202 to send an identifying message (e.g., but not limited to, a multicast message or a unicast message) across a particular multicast channel to a communication device (further referred to below), and a query module 204 to query that communication device for an identification code, to determine whether or not the communication device successfully received the identifying multicast message and thereby to establish whether or not the particular channel is accessible by the communication device. It is to be understood that the functional modules 202 to 204 may distributed among several computer systems, or alternatively may be consolidated within a single computer system. It is to be noted that the example embodiments described herein are not limited to multicast messages but that multicast message are merely used as an example message. The term "multicast message" includes any communication in a multicast format, whether comprising data packets or control packets and whether being sent or received.

The identifying multicast stream may consist of a single IP packet repeated periodically. The packet may be an RTCP (Real-time Transport Control Protocol) packet. In an example embodiment, the packet may be a UDP (User Datagram Protocol) RTP (Real-time Transport Protocol) packet which has been encoded so that the identifying multicast stream is not audible if played at its destination.

Figure 2B:
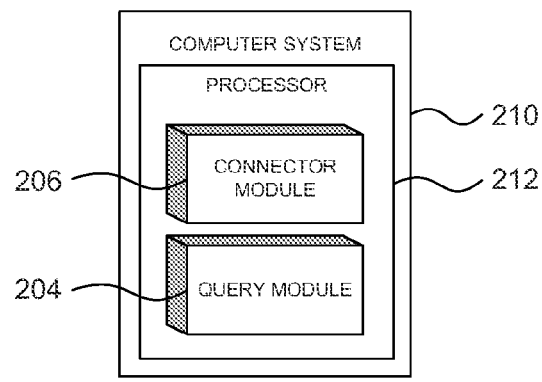
FIGS. 2b and 2c respectively show schematic representations of a computer system and a communication device in accordance with an example embodiment.

FIG. 2b shows a computer system 210 which may, for example, form part of the IPICS server 104 of FIG. 1. The computer system 210 is shown to comprise a processor 212 and a plurality of conceptual modules, and to this end, the computer system 210 may include a machine-readable medium (e.g. main memory, and/or a hard disk drive, which carries a set of instructions to direct the operation of the processor 212). The machine-readable medium may be in the form of a computer program.

Figure 2C:
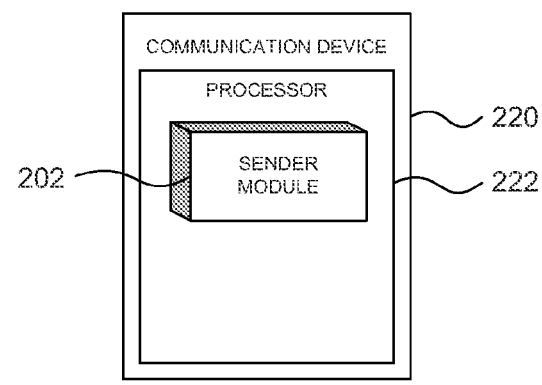

In addition to the query module 204, the computer system 210 also includes a wireless connector module 206 to connect wirelessly to a communication device 220 (see FIG. 2c), which may, for example, be in the form of a resource media server 106 to 108 or an endpoint 110 to 114. The connector module 206 may also wirelessly connect the computer system 210 to the sender module 202 of the communication device 220 to send an identifying multicast message. The communication device 220 shown in FIG. 2c also comprises a processor 222, which may function, when needed, as the sender module 202.

Figure 3:
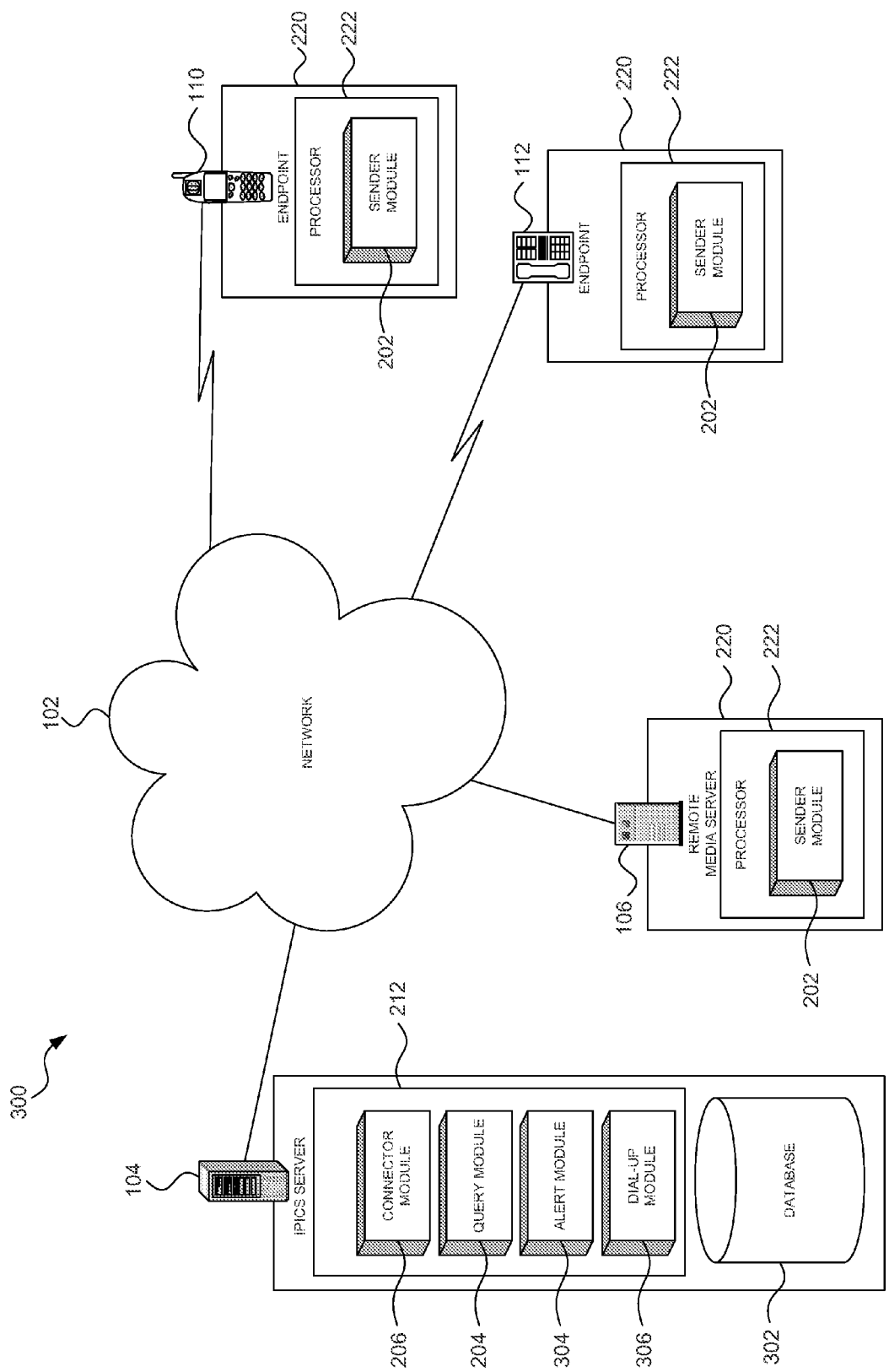
FIG. 3 shows a low-level schematic representation of a system to determine which channels are accessible in a communication network, in accordance with an example embodiment.

In FIG. 3 of the drawings, reference numeral 300 illustrates in greater detail a system similar to the system 100 of FIG. 1. For ease of description, only one resource media server 106 and only two endpoints 110 and 112 are shown, but it is to be understood that there may be a plurality of resource media servers and many more endpoints. The system 300 is configured for determining which channels are accessible by communication devices—the resource media server 106 and the endpoints 110 and 112 in this example embodiment—in a push-to-talk communication network. Briefly, the connector module 206 of the IPICS server 104 may establish a unicast connection (e.g., a secure unicast connection) with the resource media server 106 and each of the endpoints 110 and 112 to command or instruct at least one sender module 202 to generate and send an identifying message (e.g., but not limited to, a multicast or unicast message) to at least one other communication device. The identifying message may include an identification code. When the identifying message is a multicast message, this identifying message may be sent across a multicast channel having a well-known or otherwise predefined multicast address. Each sender module 202, which may conceptually be considered as a multicast accessibility detection unit, may be fully integrated within the respective communication device. This integration may, for example, be done using existing software which is used for sending and receiving multicast messages.

The query module 204 of the IPICS server 104 may then query the communication device to which the identifying message (e.g., multicast message) was sent to obtain the identification code thereby to determine whether or not that communication device can successfully receive multicast communications across the particular multicast channel. The multicast status of the communication device may then be stored in a database 302. In addition, in an example embodiment the IPICS server 104 may include an alert module 304 to alert an endpoint to the fact that the endpoint cannot receive multicast communications across a particular multicast channel. The IPICS server 104 may also include a dial-up module 306 for facilitating interoperability between phones and any given VTG or channel. It is to be understood that, because the endpoint is then connected to the IPICS server 104 or other communication device via a dial-up connection certain networks or network elements may be bypassed that may be hindering multicast communications. Thus, the endpoint may successfully communicate on desired channels or with other desired endpoints.

In an alternative example embodiment, it may be the IPICS server 104 which sends the identifying multicast message, depending on the configuration of network 102. In such a case, it will be the IPICS server 104, rather than the communication devices, which includes the sender module 202.

Figure 4A:
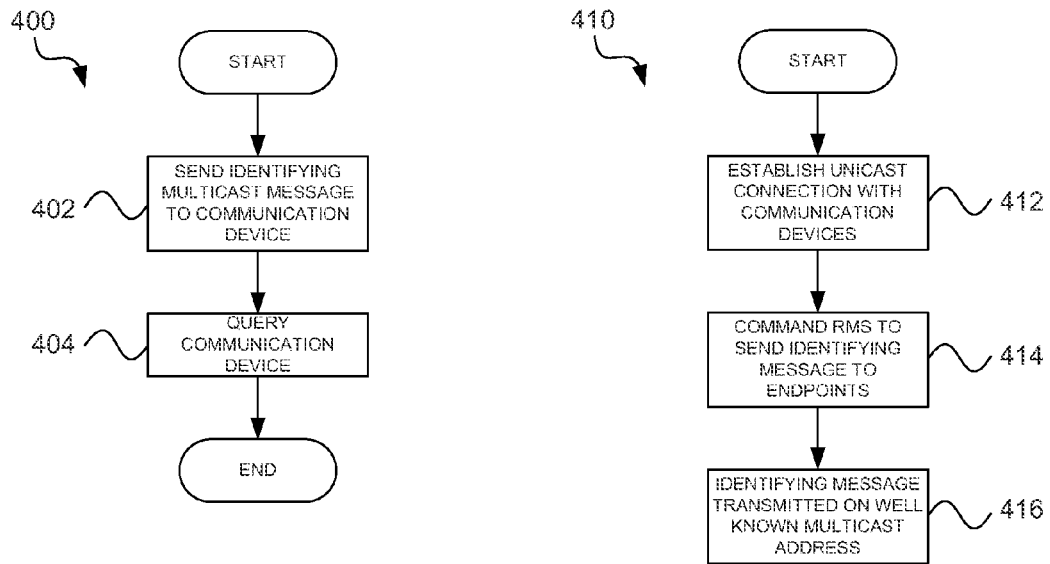
FIG. 4a shows a high-level flow diagram of a method, in accordance with an example embodiment, for determining which channels are accessible by a communication device in a push-to-talk communication network.
Figure 4B:
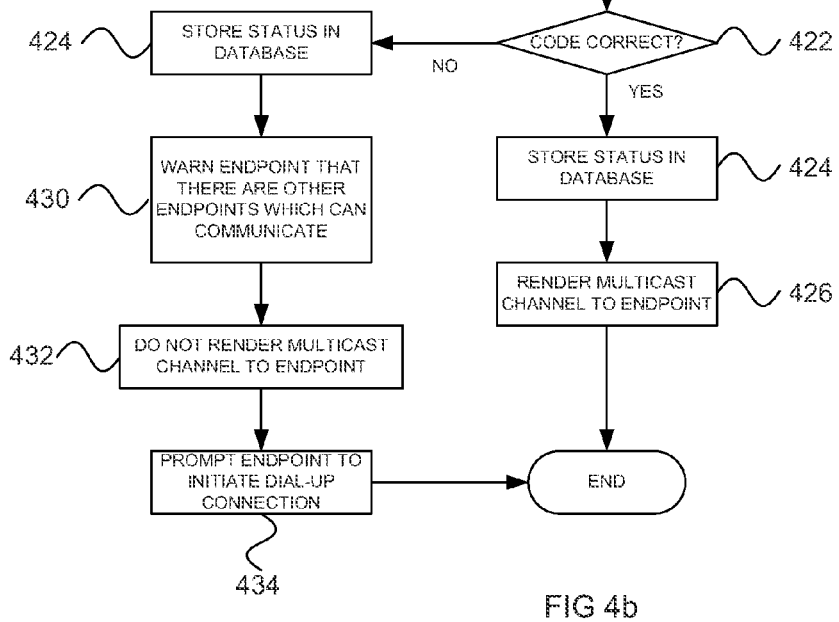
FIG. 4b shows a low-level flow diagram of a method, in accordance with an example embodiment, for determining which channels are accessible by a communication device in a push-to-talk communication network.
Figure 4C:
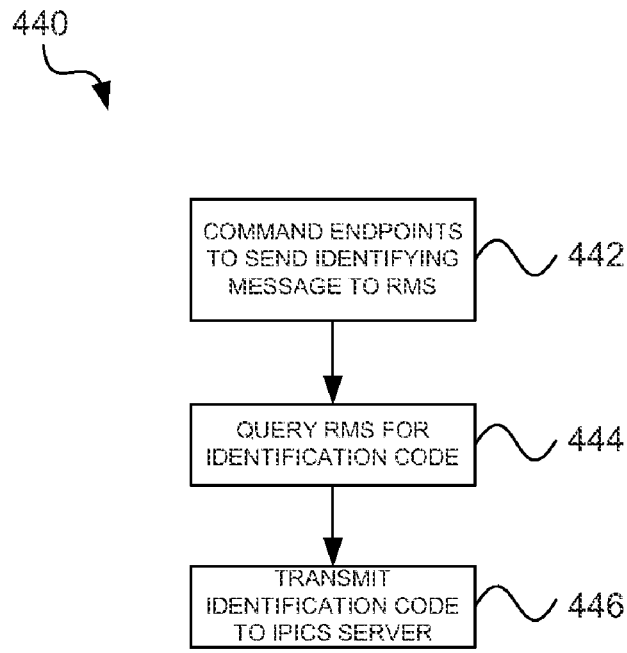
FIGS. 4c and 4d show flow diagram extracts of operation which may be used instead of, or in addition to, some of the operations of the flow diagram of FIG. 4b.
Figure 4D:
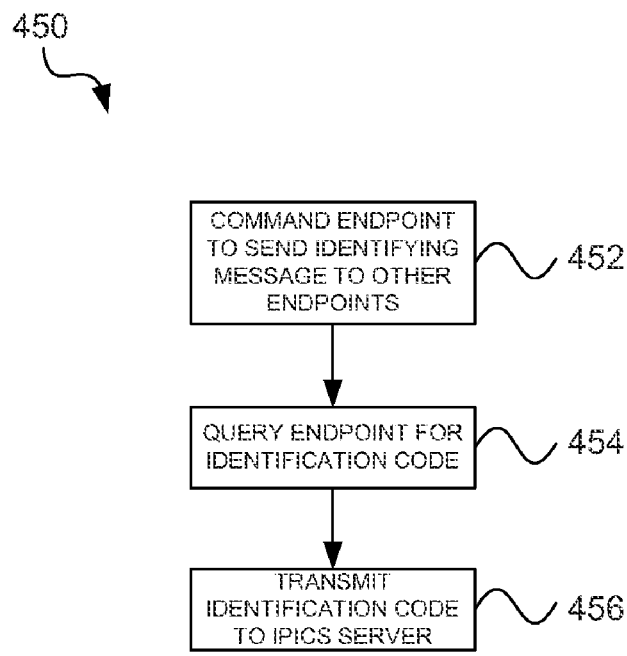
Figure 5:
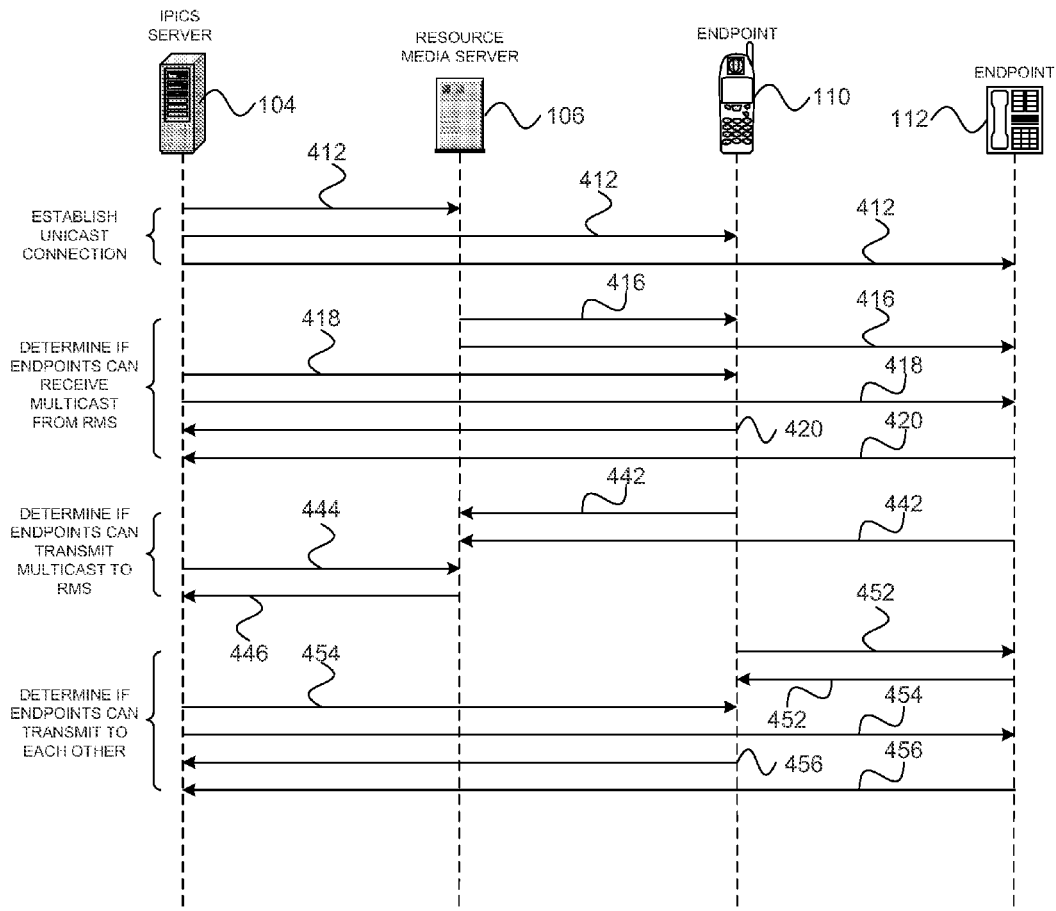
FIG. 5 shows an interaction diagram of a method, in accordance with an example embodiment, for determining which channels are accessible by a communication device in a push-to-talk communication network.

An example method 400, in accordance with an example embodiment, for determining which channels are accessible by a communication device in a push-to-talk communication network is described further with reference to FIGS. 4 and 5. FIG. 4a shows very broadly a flow diagram of the method 400, in accordance with an example embodiment, for determining which channels (or VTGs) are accessible by a communication device in a push-to-talk communication network. FIG. 5 shows an interaction diagram 500 of a method, in accordance with an example embodiment, for determining which channels are accessible by a communication device in a push-to-talk communication network.

Referring to FIG. 4, in the method 400 a network connectivity message is sent to the communication device. Merely by way of example, the network connectivity message is described herein as an identifying multicast message that is sent, at block 402, across a particular multicast channel to the communication device, the identifying multicast message including an identification code. It should be noted that the example embodiments described herein are however not restricted or limited to multicast messages. The communication device is queried, at block 404, for the identification code to determine whether or not the communication device successfully received the identifying multicast message, thereby to establish whether or not the particular multicast channel is accessible by the communication device.

FIG. 4b shows a more detailed flow diagram of a method 410, in accordance with an example embodiment, for determining which channels are accessible by a communication device in a push-to-talk communication network. The method 410 may be deployed in the system 300 of FIG. 3, and accordingly, is described by way of example with reference thereto. The method 410 is also described by way of example with reference to the interaction diagram 500 shown in FIG. 5.

In the example method 410, the IPICS server 104 may establish, at block 412, a connection (e.g., a unicast connection) with each communication device (e.g., the resource media server 106 and the endpoints 110 and 112 using the connector module 206). In an example embodiment, the unicast connection may be a secured connection using, for example, HTTPS or TCP IP. The IPICS server 104 may then command the resource media server 106 to send, at block 414, an identifying multicast message on a well-known multicast address to each of the endpoints 110 to 114. The identifying multicast message may include an identifying code which could be a random number or other unique number sequence and which may be changed for each request. The identifying multicast message may be generated either by the sender module 202 of the resource media server 106 or by the IPICS server 104 itself. Instead of using a well-known multicast address, in an example embodiment the system 300 may be configured to use a particular predefined multicast address, for example if push-to-talk communication is necessary on that particular multicast address. A particular predefined multicast address may be used when a dedicated multicast channel or virtual talk group has been set up for a specific purpose. In an example embodiment, the network connectivity message may include specially marked RTCP packets which are used only to ensure media connectivity; these packets are not rendered into the speakers of the endpoints.

In an example embodiment, as shown at block 416, the identifying message may be transmitted on a well known multicast address. As shown at block 418, the IPICS server 104 may then, using the query module 204, query each endpoint 110 to 114 for the identification code of a network connectivity message (e.g., but not limited to, an identifying multicast message). In response, each endpoint 110 to 114 may transmit, at block 420 the identification code to the IPICS server 104. It will be appreciated that an endpoint 110 may only transmit the identification code if it has been previously received by the endpoint. Thereafter, as shown at block 422, the IPICS server 104 may compares the identification code received from each endpoint 110 and 112 with the transmitted identification code so as to determine whether or not each endpoint 110 and 112 has correctly received the identifying multicast message (e.g., when the network connectivity message is a multicast message) transmitted by the resource media server 106. If the identification code received does match the identification code transmitted, the system may conclude or assume that the particular endpoint can receive multicast messages from the resource media server 106. Conversely, if the identification code does not match, or if the particular endpoint did not receive a network connectivity message with a proper identification code, the system may conclude that endpoint cannot receive multicast messages from the resource media server 106.

FIGS. 4c and 4d show flow diagram extracts of operation which may be used instead of, or in addition to, some of the operations of the flow diagram of FIG. 4b. In FIG. 4c, a method 440 is shown that performs similar functionality to that described in steps 414, 416, 418 and 420 of FIG. 410. The method 440 may be performed to determine whether or not the endpoints 110 to 114 can transmit multicast messages to the resource media server 106 and amongst themselves. In this case, the IPICS server 104 may command the endpoints 110 to 114 to send, at block 442, a network connectivity message (e.g., an identifying multicast message) to the resource media server 106. As shown at block 444, in response thereto, IPICS server 104 may query the resource media server 106 for the identification code. In the event of the resource media server 106 having received the code, it may then transmit the identification code to the IPICS server 104 (see block 446 and FIG. 5). If an endpoint can both send multicast messages to and receive multicast messages from the resource media server 106, the endpoint is said to have a full duplex multicast connectivity and thus full accessibility to the resource media server 106.

Referring now also to FIG. 4d which shows a flow diagram of a method 450 including similar functionality to the steps 414, 416, 418 and 420 shown in FIG. 4b. In the method 450 each endpoint 110 and 112 is commanded to send, at block 452, a network connectivity message to each other endpoint, to determine whether or not the endpoints 110 to 114 can successfully communicate multicast messages with each other. Each endpoint may then be queried, at block 454, for the identification code and, in response thereto, the endpoints transmits, at block 456, the identification code, if present (see also FIG. 5).

As shown at block 424 in FIG. 4b, the results of the above determinations may then be stored in a database 302 (see FIG. 3) connected to the IPICS server 104. The results may then be used to provide the system 300 with added functionality. For example, if endpoint 110 does have full duplex access across a particular multicast channel to the resource media server 106, that multicast channel is rendered, at block 426, to the endpoint 110 such that a user of the endpoint 110 may select that channel for successful push-to-talk communication In block 430 an alert may be sent by the alert module 304 to the endpoint 112 to warn a user of the endpoint 112 that a specific channel has not been rendered to the user because the network does not support the user's connectivity with the other endpoints which may be using this specific channel or VTG. The specific multicast channel may thus not be rendered to the endpoint (see block 432). The alert may be in the form of a pop-up message, or the like. Similarly, if endpoints 112 or 114 cannot communicate directly with one or more at the endpoints, the endpoints 112 or 114 are alerted to this. In an example embodiment, a channel name or identifier on a display screen of an endpoint may be grayed out (or otherwise modified) to provide an indication that the channel is not reachable.

In an example embodiment the endpoint 112 may optionally be prompted (see block 434) by the IPICS server 104 to initiate a dial-up connection by an optional dial-up module 306 to communicate in a channel which is not accessible otherwise to the endpoint 112 via multicast over the current network 102. Instead of prompting the user, the system 300 may automatically initiate a dial-up connection to the endpoint 112. In such case, the IPICS server 104 may automatically collect the credentials of the endpoint 112 to automatically authenticate and transfer the endpoint 112 to a desired channel.

It is to be appreciated that, in use, when an endpoint logs onto or accesses the IPICS server 104, the method 410 may be automatically executed thereby to render the new endpoint with an accurate list of channels to which the endpoint may subscribe and thus allow the endpoint to correctly communicate in using a multicast protocol across the rendered channels.

An example embodiment of the methods and systems described by way of example herein may be found in communications for emergency services. It is however important to note that the methods and systems described herein are not restricted to deployment in emergency services. For example, a patrolling officer may have a push-to-talk telephone or endpoint with which he/she needs to communicate with a dispatcher or other officers. Typically, if the patrolling officer logs onto a channel, for example a police channel to listen to any urgent bulletins, it may happen that his/her telephone indicates a successful connection to the channel, whereas in fact the endpoint is incompatible with a network or he/she has traveled to a region where the device does not have access to the network. When the officer listens to the channel, he/she may hear no activity and may incorrectly conclude that his/her services are not needed, while, in fact, urgent communications may be going on and about which the officer is completely unaware.

If the officer is aware that the particular channel is not functioning correctly (e.g., using the systems and methods described herein) the officer can make alternative arrangements for communication, for example by switching channels or by initiating a dial-up connection. The officer would then know on which channels communication is possible.

Figure 6:
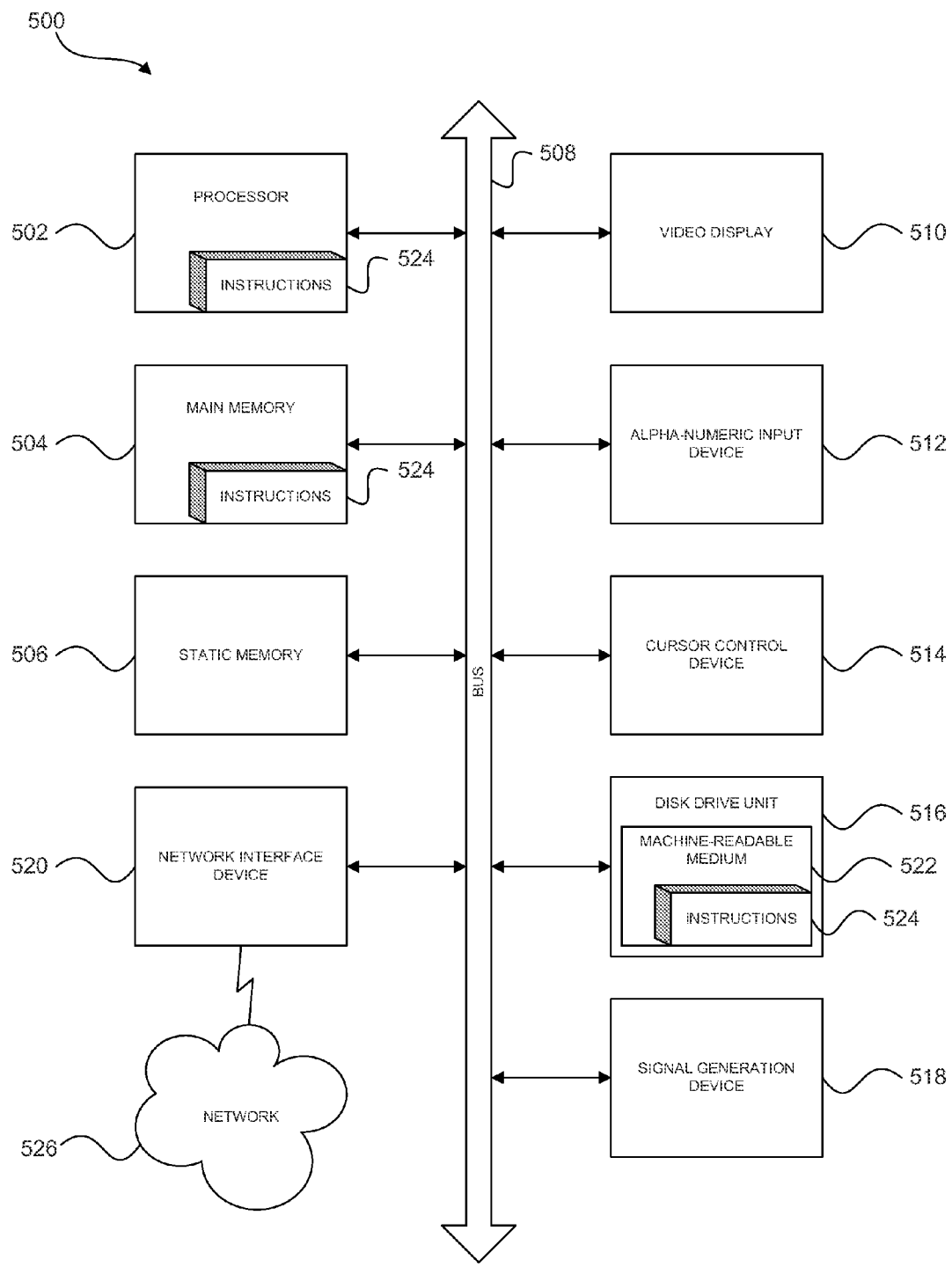
FIG. 6 shows a diagrammatic representation of machine in the example form of a computer system within which a set of instructions, for causing the machine to perform any one or more of the methodologies discussed herein, may be executed.

FIG. 6 shows a diagrammatic representation of machine in the example form of a computer system 500 within which a set of instructions, for causing the machine to perform any one or more of the methodologies discussed herein, may be executed. In alternative embodiments, the machine operates as a standalone device or may be connected (e.g., networked) to other machines. In a networked deployment, the machine may operate in the capacity of a server or a client machine in a server-client network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 500 includes a processor 502 (e.g., a central processing unit (CPU), a graphics processing unit (GPU) or both), a main memory 504 and a static memory 506, which communicate with each other via a bus 508. The computer system 500 may further include a video display unit 510 (e.g., a liquid crystal display (LCD) or a cathode ray tube (CRT)). The computer system 500 also includes an alphanumeric input device 512 (e.g., a keyboard), a user interface (UI) navigation device 514 (e.g., a mouse), a disk drive unit 516, a signal generation device 518 (e.g., a speaker) and a network interface device 520.

The disk drive unit 516 includes a machine-readable medium 522 on which is stored one or more sets of instructions and data structures (e.g., software 524) embodying or utilized by any one or more of the methodologies or functions described herein. The software 524 may also reside, completely or at least partially, within the main memory 504 and/or within the processor 502 during execution thereof by the computer system 500, the main memory 504 and the processor 502 also constituting machine-readable media.

The software 524 may further be transmitted or received over a network 526 via the network interface device 520 utilizing any one of a number of well-known transfer protocols (e.g., HTTP).

While the machine-readable medium 522 is shown in an example embodiment to be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing, encoding or carrying a set of instructions for execution by the machine and that cause the machine to perform any one or more of the methodologies of the present invention, or that is capable of storing, encoding or carrying data structures utilized by or associated with such a set of instructions. The term "machine-readable medium" shall accordingly be taken to include, but not be limited to, solid-state memories, optical and magnetic media, and carrier wave signals.

The Abstract of the Disclosure is provided to comply with 37 C.F.R. §1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment.

Any one or more of the systems described herein (e.g. the IPICS server 104, the resource media servers 106 and 108, and the endpoints 110 to 114) may be in the form of computer system 500.

In an example embodiment, whether or not an endpoint can reach another endpoint or resource media server via multicast can be automatically verified. Further, in an example embodiment, whether or not a resource media server can reach endpoints can also be verified and multicast access ability for endpoints belonging to a given channel (or virtual talk group) can be tested. In an example embodiment, channels may only be rendered if endpoint has full access to those channels, thus not misleading a user of endpoint into thinking that the endpoint may have access to other channels. In response to an endpoint's not having full access to one or more multicast channels, a dial-up connection may be initiated automatically or on confirmation of a prompt. Further, the example embodiments may facilitate troubleshooting in multicast push-to-talk networks.

Although the example embodiments are described by way of example with reference to multicast accessibility, it should be noted that the embodiments may, for example utilize unicast connectivity. In an example embodiment, channels may utilize a hybrid connectivity of multicast for part of the media transport and unicast for other portions of the network transport. In an example embodiment a hybrid topology may be provided wherein an endpoint A connects to an RMS1 via unicast, an endpoint B may connect to an RMS2 via unicast. The connection between RMS1 and RMS2 may be multicast. In this example topology it should be noted that not only unicast end-to-end connectivity is utilized. Thus in the example embodiments, a generic connectivity verification (multicast, unicast, etc) is utilized regardless of the unicast/multicast underlying media connectivity. Thus, example embodiments may utilize unicast, multicast, and the above mentioned hybrid topology.

What is claimed is:

1. A method for determining which channels are accessible by a communication device in a push-to-talk communication network, the method comprising:
   sending a plurality of identifying network connectivity messages to the communication device across multiple network channels in the push-to-talk communication network, each identifying network connectivity message being sent across a respective network channel, each identifying network connectivity message including an identification code unique to that identifying network connectivity message; and querying the communication device for the identification code included in a particular one of the plurality of identifying network connectivity messages which was sent across a corresponding particular network channel, to determine if the communication device received the particular identifying network connectivity message to establish if the particular network channel is accessible by the communication device.

2. The method as claimed in claim 1, wherein the particular identifying network connectivity message is a multicast message.

3. The method as claimed in claim 1, in which, prior to sending the particular identifying network connectivity message, the method comprises establishing a unicast connection between a push-to-talk integration server and the communication device.

4. The method as claimed in claim 1, which comprises sending the particular identifying network connectivity message from a resource media server to the communication device to establish if communication from the resource media server to the communication device over the particular network channel is possible.

5. The method as claimed in claim 4, which comprises sending particular the identifying network connectivity message from one communication device to another communication device to establish if communication between the respective communication devices over the particular network channel is possible.

6. The method as claimed in claim 1, which comprises sending the particular identifying network connectivity message to a resource media server.

7. The method as claimed in claim 6, which comprises sending the particular identifying network connectivity message from the communication device to the resource media server to establish if communication from the communication device to the resource media server over the particular network channel is possible.

8. The method as claimed in claim 1, which comprises rendering the particular network channel to the communication device only if it is established that the particular channel is accessible by the communication device.

9. The method as claimed in claim 1, which comprises:
rendering the particular network channel to the communication device; and
alerting a user that selection of the particular channel by the user is inhibited by the push-to-talk communication network.

10. The method as claimed in claim 1, which comprises providing a pop-up alert to notify a user of a status of the connection of the communication device to the particular network channel.

11. The method as claimed in claim 1, wherein the particular identifying network connectivity message is an RTP or RTCP message.

12. The method as claimed in claim 11, wherein packets included in the RTP or RTCP message are not rendered to a user via the communication device.

13. The method as claimed in claim 1, which comprises initiating a dial-up connection with the communication device in response to the particular network channel being inaccessible by the communication device.

14. The method as claimed in claim 1, which comprises sending the particular identifying network connectivity message from one communication device to another under direction of a push-to-talk integration server.

15. The method as claimed in claim 1, in which the particular network channel over which the particular identifying network connectivity message is sent has a well known multicast address or a pre-defined multicast address.

16. A non-transient machine-readable medium embodying instructions which, when executed by a system, cause the system to:
send a plurality of identifying network connectivity messages to the communication device across multiple network channels in a push-to-talk communication network, each identifying network connectivity message being sent across a respective network channel, each identifying network connectivity message including an identification code unique to that identifying network connectivity message; and
query the communication device for the identification code included in a particular one of the plurality of identifying network connectivity messages which was sent across a corresponding particular network channel, to determine if the communication device successfully received the particular identifying network connectivity message, thereby to establish if the particular network channel is accessible by the communication device.

17. A system to determine which channels are accessible by a communication device in a push-to-talk communication network, the system comprising:
a sender module to send a plurality of identifying network connectivity messages to the communication device across multiple network channels in the push-to-talk communication network, each identifying network connectivity message being sent across a respective network channel, each identifying network connectivity message including an identification code unique to that identifying network connectivity message; and
a query module to query the communication device for the identification code included in a particular one of the plurality of identifying network connectivity messages which was sent across a corresponding particular network channel, to determine if the communication device received the particular identifying network connectivity message, thereby to establish if the particular network channel is accessible by the communication device.

18. A push-to-talk integration server to determine which channels are accessible by a communication device in a push-to-talk communication network, the server comprising:
a command module to establish a unicast connection with a first communication device to command the first communication device to send an identifying network connectivity message to a second communication device across a particular network channel in the push-to-talk communication network, the push-to-talk communication network having multiple network channels, the identifying network connectivity message including an identification code unique to the identifying network connectivity message; and
a query module to query the second communication device for the identification code included in the identifying network connectivity message, to determine if the second communication device successfully received the identifying network connectivity message, thereby to establish if the particular network channel is accessible by the second communication device.

19. The server as claimed in claim 18, in which the first communication device is a resource media server and the second communication device is an endpoint, the command module being configured to command the resource media server to send the identification network connectivity message to the endpoint, and the query module being configured to query the endpoint to establish if communication from the resource media server to that particular endpoint over the particular network channel is possible.

20. The server as claimed in claim 18, in which the first communication device is an endpoint and the second communication device is a resource media server, the command module being configured to command the endpoint to send the identification network connectivity message to the resource media server, and the query module being configured to query the resource media server to establish if communication from the endpoint to the resource media server over the particular network channel is possible.

21. The server as claimed in claim 18, in which the first communication device is a first endpoint and the second communication device is a second endpoint, the command module being configured to command the first endpoint to send the identification network connectivity message to the second endpoint, and the query module being configured to query the second endpoint to establish if communication between the first and second endpoints over the particular network channel is possible.

22. The server as claimed in claim 18, which is configured to render a channel to a communication device only if it is established that the particular network channel is accessible by the communication device.

23. The server as claimed in claim 18, which comprises a dial-up module to initiate a dial-up connection to or from the communication device in response to the particular network channel being inaccessible by the communication device.

24. A resource media server configured to determine which network channels are accessible by a remote communication device in a push-to-talk communication network, the resource media server comprising:
 a sender module to communicate with the push-to-talk communication network, the push-to-talk communication network having multiple network channels; and
 a processor to cause the sender module to send a plurality of identifying network connectivity messages to the remote communication device across multiple network channels in the push-to-talk communication network, each identifying network connectivity message being sent across a respective network channel, each identifying network connectivity message including an identification code unique to that identifying network connectivity message.

25. A system to determine which network channels are accessible by a communication device in a push-to-talk communication network, the system comprising:
 means for sending a plurality of identifying network connectivity messages to the communication device across multiple network channels in the push-to-talk communication network, each identifying network connectivity message being sent across a respective network channel, each identifying network connectivity message including an identification code unique to that identifying network connectivity message; and
 means for querying the communication device for the identification code included in a particular one of the plurality of identifying network connectivity messages which was sent across a corresponding particular network channel, to determine if the communication device received the particular identifying network connectivity message to establish if the particular network channel is accessible by the communication device.

* * * * *

UNITED STATES PATENT AND TRADEMARK OFFICE
CERTIFICATE OF CORRECTION

| | | |
|---|---|---|
| PATENT NO. | : 7,885,674 B2 | Page 1 of 1 |
| APPLICATION NO. | : 11/466388 | |
| DATED | : February 8, 2011 | |
| INVENTOR(S) | : Shmuel Shaffer et al. | |

It is certified that error appears in the above-identified patent and that said Letters Patent is hereby corrected as shown below:

In column 9, line 29, in Claim 5, delete "particular the" and insert -- the particular --, therefor.

Signed and Sealed this
Twelfth Day of April, 2011

David J. Kappos
*Director of the United States Patent and Trademark Office*